METHOD FOR STABILIZING GLYCIDOL

Stephen E. Cantor, Cheshire, Conn., Gordon Dwight Brindell, Crystal Lake, Ill., and Robert John Quint, Naugatuck, Conn., assignors to Uniroyal, Inc., New York, N.Y.
No Drawing. Filed Feb. 18, 1972, Ser. No. 227,598
Int. Cl. C07d 1/18
U.S. Cl. 260—348 R    3 Claims

ABSTRACT OF THE DISCLOSURE

Unstable glycidol and glycidol-type compounds are stabilized by reacting them with acrylonitrile, acrylonitrile-type compounds, or both, in the presence of catalytic amounts of organic bases, particularly strong organic bases, to produce a stable cyanoalkylepoxy ether. The glycidol and glycidol-type compounds are readily recovered in essentially pure form by heating the ether in contact with the basic catalysts described above.

---

Method for stabilizing glycidol

This invention relates to a method for stabilizing glycidol and glycidol-type compounds.

Glycidol, and glycidol-type compounds, are known to be unstable, particularly in pure form, and tend to become impure because of the autopolymerization of such materials over short periods of time. For example, where these compounds are needed in highly pure form, it is frequently impractical to ship, store, or handle them, even at low temperatures, for they lose purity by formation of dimers and higher polymers at the rate of approximately 0.5 weight percent per week between temperatures of 21 and 27° C. This loss in purity compares with an average loss of 0.15 weight percent per week for glycidol stored at −5° C.

This invention provides a practical, inexpensive method for stabilizing glycidol and glycidol-type compounds by reacting them with acrylonitrile, acrylonitrile-type compounds, or both, in the presence of catalytic amounts of organic bases, to produce stable cyanoalkylepoxy ethers. These ethers can be readily reconverted to the reactants by heating the ether in contact with the organic bases used in the stabilizing reaction under conditions that are easy to control.

More specifically, the invention provides a method for obtaining unstable compounds of the general formula (I):

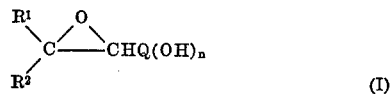

(I)

in pure form and in quantitative yield from a stable compound of the general formula (II):

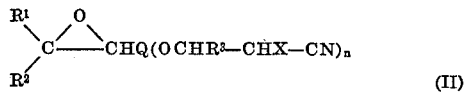

(II)

comprising heating a compound of the general formula (II) in contact with at least one organic base under anhydrous conditions. In these formulas, $R^1$ and $R^2$ are the same or different, and are selected from hydrogen and alkyl groups containing 1 to 4 carbon atoms; Q has a valence of $n$ plus 1, and is selected from alkyl groups containing 1 to 4 carbon atoms, cycloalkyl groups containing 5 or 6 carbon atoms, and phenyl; X is hydrogen, or a halogen such as fluorine, chlorine, bromine or iodine; $R^3$ is hydrogen or an alkyl group containing 1 to 3 carbon atoms; and $n$ is an integer of 1 to 3.

Examples of compounds of the general formula (II) are: beta-cyanoethylglycidyl ether and beta-chloro-beta-cyanoethylglycidyl ether. Examples of compounds of the general formula (I) are: glycidol, vinyl cyclohexane monoepoxide-4-ol, para-(1,2-epoxypropane) phenol, and 2-(1,2-epoxypropane) glycerine.

Compounds of the general formula (II) are made by reacting compounds of the general formula (I) with acrylonitrile-type compounds of the general formula (III):

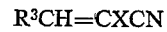

wherein X and $R^3$ have the meanings given above. The reaction is conducted anhydrously under mild conditions of temperature and pressure as more particularly described in copending patent application U.S. Ser. No. 227,597, filed Feb. 18, 1972 and now abandoned.

The organic bases that are the catalysts for this invention are used in amounts sufficient to promote facile conversion of the reactants to the desired products. Typically, 0.01 or less to 3 or more mole percent, based on the number of moles of reactants, of catalyst is used. Generally, these catalysts are organic derivatives of nitrogen such as onium hydroxides, aliphatic and aromatic amines and amide salts and preferably soluble derivatives of these compounds. Among the more effective basic organic catalysts are: anion exchange resins of the quaternary ammonium type; Triton B, which is benzyl trimethyl ammonium hydroxide; and other soluble bases like pyrrolidine.

The catalytic anion exchange resins are generally of the type described in an article entitled "Ion Exchange" by R. H. Wheaton and A. H. Seamster of Dow Chemical Company, published in the Kirk-Othmer Encyclopedia of Chemical Technology, second revised edition, pages 871 to 899 (Interscience Publishers, New York, 1966). As stated there, the resins typically contain quaternary ammonium groups fixed to a poly(styrene-divinylbenzene) matrix.

Synthesis involves chloromethylation of the copolymer bead using chloromethyl ether and a Friedel-Crafts condensation catalyst such as aluminum chloride. The beads become fully swollen in the ether. An alternate approach to making poly(vinylbenzyl chloride) is through the sidechain chlorination of poly(vinyltoluene). After chloromethylation or chlorination, the product is reacted with a tertiary amine in the presence of a polar solvent such as water to form a quaternary ammonium salt.

A large number of these structures have been prepared using various tertiary amines. Only two, however, have obtained prominence: those derived from trimethylamine (Amberlites IRA–400, IRA–401, IRA–402 and IRA–900; Duolites A–101–D and ES–111; Dowexes 1, 11 and 21 K; and Ionac A–540) and those drived from dimethylethanolamine (Amberlites IRA–410 and IRA–911; Dowex 2; Duolite A–102–D; and Ionacs A–542 and A–550).

The method of this invention provides recovery of glycidol and glycidol-type compounds from compounds of the general formula (I) by heating the compounds of the general formula (II) under vacuum and collecting the glycidol-type compounds produced in a condenser or other suitable equipment. This heating and distillation can be a batch or a continuous process, and the glycidol-type compounds obtained are free of polymeric contaminants and highly pure, typically 98% or higher. In practice, the use of certain "chasers," which are added to the material being heated, promotes complete recovery of the glycidol-type compound. The "chasers" are high boiling oils, which permit the essentially complete recovery of the lower boiling material. Without the "chasers" some of the product would remain in the distillation vessel. Glycidol and glycidol-type compounds are typically produced as a vapor, and must therefore be recovered in a cooling zone.

Generally, the heating and simultaneous distillation is conducted under conditions of temperature and pressure sufficient to promote essentially complete conversion of the compound of the general formula (II) to the glycidol (or glycidol-type) and acrylonitrile (or acrylonitrile-type) compounds. Specifically, the temperature of heating and distillation can vary from 45 to 200 degrees Centigrade (C.) and the pressure, from 1 to 25 millimeters (mm.) of mercury.

The following examples illustrate the practice of the invention, but are not intended to limit the scope thereof.

as a "chaser" and 10 drops (0.22 g.) of base. The flask was connected to a vacuum distillation apparatus, and an oil bath set at 165° C. was used to heat the flask containing "chaser" and base. The pure CEGE was dropped slowly, under vacuum (3 mm. Hg), into the hot mixture. The acrylonitrile evolved was collected in a Dry-Ice-acetone bath. The pure glycidol was recovered in a standard 100 ml. receiver. The yield of acrylonitrile was 52 grams (about one mole), and the yield of glycidol was 63 grams (0.85 mole) using 40% methanolic Triton B catalyst. Results with other catalysts are shown in Table 1.

TABLE 1

| Run | CEGE[a] (moles) at start | Catalyst (mole percent) | Temperature (° C.), pressure (mm. Hg) | ACN[c] (moles) | Glycidol (moles) | Percent conversion to glycidol | Residue (moles) |
|---|---|---|---|---|---|---|---|
| 2 | 0.044 | Triton B (0.01) | 100–130; (3) | 0.040 | 0.025 | 57 | 0.015 |
| 3 | 0.044 | ...do... | 130–135; (3) | 0.044 | 0.03 | 68 | 0.014 |
| 4 | 0.044 | ...do... | 170–175; (6) | 0.044 | 0.035 | 80 | 0.022 |
| 5 | 0.044 | Pyrrolidine (1) | 175–180; (8) | 0.044 | 0.036 | 82 | 0.003 |
| 6 | 0.044 | IRA–400 [b] (0.1 gram) | 140–150; (3) | 0.044 | 0.014 | 32 | 0.028 |

[a] Assumed to be polymers of glycidol.
[b] Base-washed anion exchange resin.
[c] Acrylonitrile.

EXAMPLE I

Stabilization of glycidol

To a 1-liter, 3-neck flask, fitted with a stirrer, thermometer and dropping funnel, were added 100 grams (1.35 moles) of glycidol and 300 grams (5.6 moles) of acrylonitrile. The mixture was stirred rapidly and heated to 40° C., then 10 drops of 40% methanolic Triton B were added. An exotherm developed in 5 minutes, and the mixture was cooled. The temperature had risen to 80° C., but was reduced to 40° C. with an ice bath. Analysis of the product using vapor-phase chromatography showed that all the glycidol had been converted to cyanoethyl glycidyl ether (CEGE).

A few drops of acetic acid were added to neutralize the benzyl trimethyl ammonium hydroxide (Triton B) followed by two 150 ml. portions of water. The acrylonitrile layer was later separated and dried over anhydrous magnesium sulfate. Distillation at 100 to 150 mm. of mercury removed the excess acrylonitrile. The remaining dark oil distilled at 140° C. and 2 to 3 mm. of Hg to yield 135 grams (79% yield) of pure CEGE (boiling point 98–100° C.).

The CEGE produced in this example is quite stable at widely varying conditions of temperature and pressure. The pure CEGE was stored for ten months at 34° C. During that period, the refractive index ($N_D^{20}$), which is an excellent measure of purity, decreased by only 0.0013 unit. Under the same storage conditions, an equal quantity of glycidol was completely polymerized.

EXAMPLE II

Recovery of pure glycidol from CEGE

One mole (127 grams) of pure CEGE was placed in a dropping funnel attached to a 500 ml., 2-neck flask. The flask contained 75 grams of di-tert-butyl phthalate to act

We claim:

1. A method for stabilization and recovery of glycidol comprising the steps of
   (a) reacting glycidol with acrylonitrile or beta-haloacrylonitrile in the presence of an organic base catalyst selected from the group consisting of quaternary ammonium anion exchange resins, benzyl trimethyl ammonium hydroxide, and pyrrolidine,
   (b) isolating the resultant stable beta-cyanoethyl glycidyl ether or beta-halo-beta-cyanoglycidyl ether, and
   (c) recovering the pure glycidol when needed by heating and distilling the product of (b) under anhydrous conditions at a pressure of 1 to 25 millimeters of mercury, at a temperature of 45° to 200° C., and in the presence of said organic base catalyst.

2. The method of claim 1, wherein step (c) is carried out by using a chaser as a distillation aid.

3. The method of claim 2, wherein said chaser is di-tertiary-butyl phthalate.

References Cited

UNITED STATES PATENTS 2,280,792  4/1942  Bruson ............ 260—347.8

FOREIGN PATENTS 2,009,347  2/1970  Germany.

OTHER REFERENCES

Organic Reactions, Vol. V (1952), pp. 89, 90.
Chemical Abstracts, Vol. 66 (1967), 37191b.

NORMA S. MILESTONE, Primary Examiner